(12) United States Patent
Lei

(10) Patent No.: US 7,554,272 B2
(45) Date of Patent: Jun. 30, 2009

(54) LOW NOISE ELECTROLUMINESCENT LAMP (EL) DRIVER AND METHOD THEREFOR

(75) Inventor: Jimes Lei, Milpitas, CA (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 11/676,865

(22) Filed: Feb. 20, 2007

(65) Prior Publication Data

US 2007/0200508 A1  Aug. 30, 2007

Related U.S. Application Data

(60) Provisional application No. 60/777,260, filed on Feb. 27, 2006.

(51) Int. Cl.
*H05B 41/16* (2006.01)

(52) U.S. Cl. .................. 315/247; 315/246; 315/209 R; 315/291; 315/224

(58) Field of Classification Search .................. 315/247, 315/246, 224, 225, 209 R, 291, 307
See application file for complete search history.

(56) References Cited

U.S. PATENT DOCUMENTS

| | | | | |
|---|---|---|---|---|
| 5,465,029 A | * | 11/1995 | Hanazaki et al. | 315/308 |
| 5,626,619 A | * | 5/1997 | Jacobson et al. | 607/5 |
| 5,686,797 A | * | 11/1997 | Sanderson | 315/209 R |
| 2004/0120090 A1 | * | 6/2004 | Galli et al. | 361/115 |

* cited by examiner

*Primary Examiner*—Tuyet Vo
(74) *Attorney, Agent, or Firm*—Jeffrey D. Moy; Weiss & Moy, P.C.; Supertex, Inc.

(57) ABSTRACT

An EL driver circuit has a full H-bridge circuit. A boost converter is coupled to the full H-bridge circuit. The boost converter is pulse width modulated to generate a gradual increase in voltage to be applied to the full H-bridge circuit to drive an EL lamp.

13 Claims, 3 Drawing Sheets

LOW NOISE ELECTROLUMINESCENT LAMP (EL) DRIVER AND METHOD THEREFOR

RELATED APPLICATION

This application is related to U.S. Provisional Application Ser. No. 60/777,260, filed Feb. 27, 2006, in the name of the same inventor listed above, and entitled, "LOW NOISE EL DRIVER". The present patent application claims the benefit under 35 U.S.C. §119(e).

FIELD OF THE INVENTION

The invention relates to an electroluminescent (EL) lamps, and, more specifically, to a circuit and method of driving an EL panel by waveshaping the differential voltage seen by the EL panel to reduce audible noise emitted by the EL lamp and minimize electrical coupling to the keypad sensing circuitry.

BACKGROUND OF THE INVENTION

Mobile phone keypads require a means of backlighting so the user can identify the individual key. A common means of lighting the keypad is by using LEDs. An alternative means of backlighting the keypads is by an electroluminescent (EL) lamp. The advantages of an EL lamp versus LEDs are its physical thinness, physical flexibility, and light uniformity. The disadvantage of EL lamps is that they produce audible noise. The mobile phone manufacturers are always challenged to produce thinner and thinner phones. For this reason, EL lamps have been chosen as a means to light up the keypad without any substantial increase in overall thickness.

The EL lamps flexibility and thinness allows the EL lamp to be placed just underneath the keypad. The EL lamp's light uniformity eliminates the need for a light diffuser. The uniform light provides the keypad with a more pleasing appearance. The construction of the lighted keypad can therefore be made very thin. Being that the end product is a mobile phone; any audible noise generated by the EL lamp is undesirable. Care must be taken to minimize electrical coupling to the keypad sensing circuit.

Therefore, a need exists to provide a device and method to overcome the above problems. The device and method will provide a circuit and method of minimizing the audible noise generated by the EL lamp and electrical noise to the keypad circuitry. A means of minimizing the audible noise by special drive techniques will allows mobile phone manufacturers to employ EL lamps to produce thin lighted keypads for their final product.

SUMMARY OF THE INVENTION

In accordance with one embodiment of the present invention, an EL driver circuit is disclosed. The EL driver circuit has a full H-bridge circuit. A boost converter is coupled to the full H-bridge circuit. The boost converter is pulse width modulated to generate a gradual increase in voltage to be applied to the full H-bridge circuit to drive an EL lamp.

In accordance with another embodiment of the present invention, an EL driver circuit is disclosed. The EL driver circuit has a full H-bridge circuit. A boost converter is coupled to the full H-bridge circuit. The boost converter is pulse width modulated to generate a gradual increase in voltage to be applied to the full H-bridge circuit to drive an EL lamp. The boost circuit an output driver coupled to the full H-bridge. An EL frequency block is coupled to the output driver. An inductor is coupled to an input voltage. A first capacitor is coupled to the full H-bridge. A diode is coupled to the inductor and the first capacitor. A switching transistor is coupled to the inductor. A pulse width modulated switch oscillator is coupled to the switching transistor for varying a duty cycle of the switching transistor as a function of the input voltage from a voltage regulation pin. A regulation circuit is coupled to the voltage regulation pin for dictating a rising and falling edge of the EL lamp.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DESCRIPTION OF PREFFERED EMBODIMENT

EL lamps are driven with a high voltage AC waveform. Audible noise is emitted from EL Lamps when they are driven with fast slew rates. The faster the rising and falling edges are the more audible noise the EL lamp will generate. Since the EL lamp is right underneath the keypad, the fast rising and falling edges will couple electrical noise into the keypad sensing circuitry. For portable applications, a method of generating high voltage AC waveforms with relatively slow rising and falling edges from a low voltage battery is required to minimize audible noise emitted from the EL lamp and electrical interference to the keypad sensing circuitry.

Figure 1:
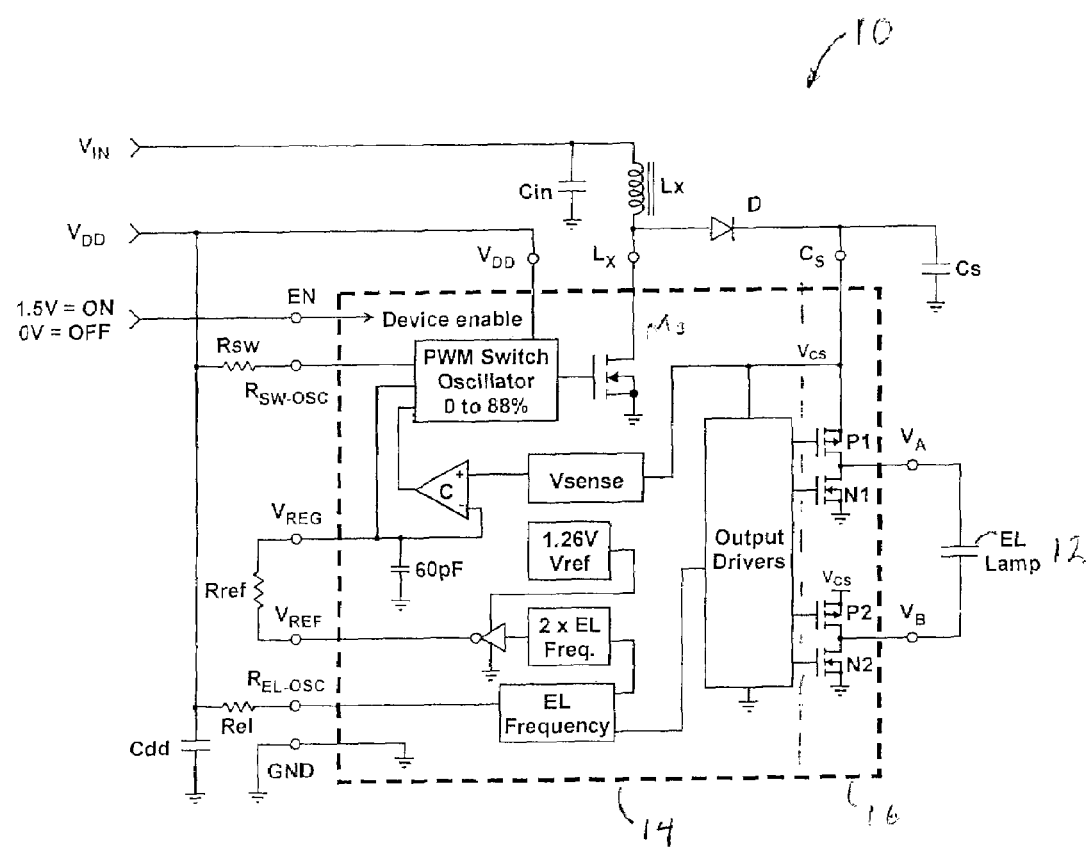
FIG. 1 is a simplified functional block diagram of the EL driver circuit of the present invention.
Figure 2:
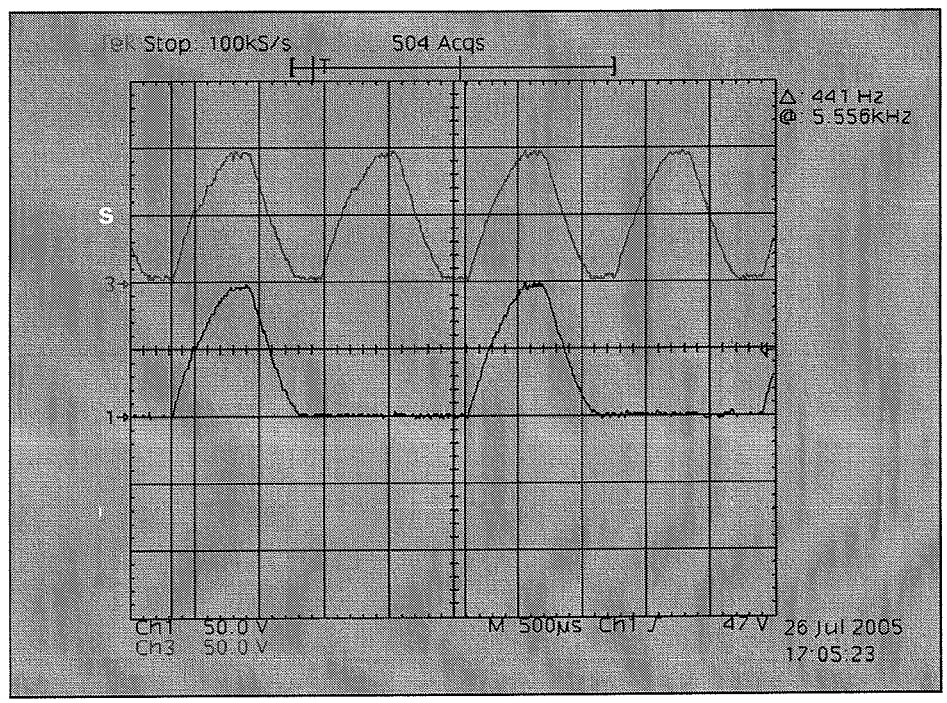
FIG. 2 is a graph showing $V_A$ and $V_B$ 180 degrees out of phase and $V_{CS}$ two times the operating voltage of the EL lamp.
Figure 3:
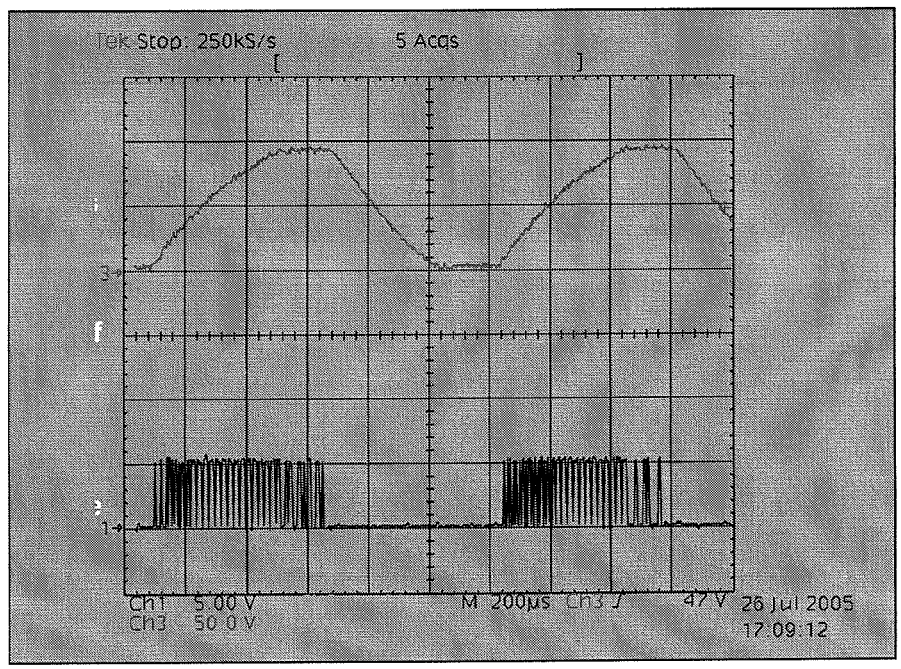
FIG. 3 is another graph showing operating parameters of the EL driver circuit of the present invention.

Referring to FIG. 1, a circuit 10 for driving an EL lamp 12 is shown. The circuit 10 will provide a high voltage AC waveform to drive an EL lamp 12. The circuit 10 uses a boost circuit 14 to generate a voltage to drive the EL lamp 12. An H-bridge 16 is coupled to the boost circuit 14 and the EL lamp 12. The H-bridge 16 is a switching circuit used to supply power to the EL lamp 12.

For the circuit 10, the input voltage $V_{IN}$ is low and can be from a Lithium battery with a voltage range of 3.0V to 4.2V. From this input voltage, a 220V peak to peak voltage switching at a frequency of 250 Hz is required to drive the EL lamp 12.

The input voltage is connected to an inductor Lx. The inductor Lx is used to boost the input voltage to a higher voltage. The switching MOSFET $M_S$ that drives the inductor Lx is pulse width modulated from 0% to 88% and runs at a switching frequency of 100 kHz set by external resistor Rsw. It is important for the switching MOSFET $M_S$ to be pulse width modulated. This helps control abrupt increase in voltage that can be seen by the EL lamp 12.

A PWM switch oscillator block 14 varies the duty cycle of the switching MOSFET $M_S$ as a function of the input voltage $V_{IN}$ seen on the $V_{REG}$ pin. As Vreg varies from 0V to 1.26V, the duty cycles varies from 0% to 88%. The waveform seen by Vreg can be controlled by an external resistor Rref. A voltage sensing block $V_{sense}$ is added to turn off the switching MOSET $M_S$ whenever the voltage seen at $V_{CS}$ exceeds its expected value.

The waveform generated on $V_{REF}$ is a square wave with an amplitude of 0V to 1.26V with a frequency of two times the EL frequency. An external resistor Rref connected across $V_{REF}$ and $V_{REG}$ will create an RC circuit where the capacitor C is an integrated 60 pF capacitor. This RC combination dictates the rising edge of the lamp.

When $V_{REF}$ transitions from 0V to 1.26V, the resistor $R_{REF}$ and the capacitor C will control how fast the voltage on capacitor $C_S$ charges. When $V_{REF}$ swings to 1.26V to 0V, the PWM switch oscillator block 14 is turned off keeping the switching MOSFET $M_S$ off.

The EL frequency is set by an external resistor $R_{el}$. This frequency is used to drive the output drivers of the H-bridge. The charging cycle for the EL lamp 12 is considered the rising edge whereas the discharging cycle is considered the falling edge.

The EL lamp terminals are connected to outputs $V_A$ and $V_B$. During the charging cycle, transistor P1 is on and transistor N2 is on. Transistor P1 charges the EL lamp 12 to the same potential as seen on capacitor $C_S$. Transistor N2 is driven such that it holds the EL lamp 12 as close to ground as possible. When transistor N2 is on it is important for it to keep the other side the EL lamp 12 as close to ground as possible during the charging cycle.

After the charging cycle, a discharge cycle occurs. Transistors N1 and N2 are turned on to differentially discharge the EL lamp 12 to 0V. Transistors N1 and N2 are driven such that this discharge rate will not exceed a certain dv/dt set internally by the EL driver. This dv/dt limiting is independent of the load. This is accomplished by sensing the voltage on $V_A$ and $V_B$ via the Miller capacitance of transistors N1 and N2. This sets the falling edge of the EL lamp 12. During the discharge cycle, transistor P1 is left on so the voltage on $V_{CS}$ is discharged to 0V.

After the discharge cycle, the device goes to another charge cycle but with transistors P2 and N1 on. This charges the EL lamp 12 with the opposite polarity of the first charge cycle. After completion of this second charge cycle, the device goes to another discharge cycle. These four phases completes an entire EL cycle.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An EL driver circuit comprising:
a boost converter; and
a full H-bridge coupled to the boost converter;
wherein the boost converter is pulse width modulated to generate a gradual increase in voltage to be applied to the full H-bridge circuit to drive an EL lamp;
wherein N-channel MOSFETs of the H-bridge are driven such that its slew rate is limited due a Miller capacitance feedback;
wherein the boost converter comprises:
an output driver coupled to the full H-bridge;
an EL frequency block coupled to the output driver;
an inductor coupled to an input voltage;
a first capacitor coupled to the full H-bridge;
a diode coupled to the inductor and the first capacitor;
a switching transistor coupled to the inductor;
a pulse width modulated switch oscillator coupled to the switching transistor for varying a duty cycle of the switching transistor as a function of the input voltage from a voltage regulation pin; and
a regulation circuit coupled to the voltage regulation pin for dictating a rising and falling edge of the EL lamp.

2. An EL driver circuit in accordance with claim 1 wherein an output voltage of the boost converter is an RC like AC waveform with a frequency equal to two times an EL frequency.

3. An EL driver circuit in accordance with claim 1 wherein P-channel MOSFETs of the H-bridge is several times weaker than the N-channel MOSEETs during a charge cycle.

4. An EL driver circuit in accordance with claim 1 wherein a voltage across a charging capacitor of the boost converter is discharged to 0V during the discharged cycle of the EL lamp.

5. An EL driver circuit in accordance with claim 1 wherein the boost converter turns off during a discharge cycle of the EL lamp.

6. An EL driver circuit in accordance with claim 1 wherein the full H-bridge circuit comprises:
a pair of PMOS transistors, wherein a first PMOS transistor is coupled to a first terminal of the EL lamp and a second EMOS transistor is coupled to a second terminal of the EL lamp; and
the N-channel MOSFETs are a pair of NMOS transistors, wherein a first NMOS transistor is coupled to the first terminal of the EL lamp and a second NMOS transistor is coupled to the second terminal of the EL lamp.

7. An EL driver circuit in accordance with claim 1 wherein the regulation circuit comprises:
a comparator having an output coupled to the voltage regulation pin;
a voltage sensing device coupled to a first input of the comparator and coupled to the first capacitor and to the pulse width modulated switch oscillator for turning off the switching transistor when the voltage across the first capacitor exceeds a predetermined value; and
a reference voltage source coupled to a second input of the comparator.

8. An EL driver circuit in accordance with claim 7 wherein the reference voltage source comprises:
a resistor coupled to the voltage regulation pin; and
a capacitor coupled to the resistor, wherein the capacitor and resistor form an RC circuit that dictates a rising edge of the EL lamp.

9. An EL driver circuit comprising:
a boost converter; and
a full H-bridge coupled to the boost converter;
wherein the boost converter is pulse width modulated to generate a gradual increase in voltage to be applied to the full H-bridge circuit to drive an EL lamp;
wherein N-channel MOSFETs of the H-bridge are driven such that its slew rate is limited due a Miller capacitance feedback; and
wherein a reference voltage for the boost converter is an RC filtered square wave being switched at two times an EL frequency.

10. An EL driver circuit comprising:
a full H-bridge circuit;
a boost converter coupled to the full H-bridge circuit, wherein the boost converter is pulse width modulated to generate a gradual increase in voltage to be applied to the full H-bridge circuit to drive an EL lamp, wherein the boost converter comprises:
an output driver coupled to the full H-bridge;

an EL frequency block coupled to the output driver;
an inductor coupled to an input voltage;
a first capacitor coupled to the full H-bridge;
a diode coupled to the inductor and the first capacitor;
a switching transistor coupled to the inductor;
a pulse width modulated switch oscillator coupled to the switching transistor for varying a duty cycle of the switching transistor as a function of the input voltage from a voltage regulation pin; and
a regulation circuit coupled to the voltage regulation pin for dictating a rising and falling edge of the EL lamp.
wherein N-channel MOSFETs of the H-bridge are driven such that its slew rate is limited due a Miller capacitance feedback; and
wherein a reference voltage for the boost converter is an RC filtered square wave being switched at two times an EL freguency.

11. An EL driver circuit in accordance with claim 10 wherein full H-bridge circuit comprises:
a pair of PMOS transistor, wherein a first PMOS transistor is coupled to a first terminal of the EL lamp and a second PMOS transistor is coupled to a second terminal of the EL lamp; and
a pair of NMOS transistors, wherein a first NMOS transistor is coupled to the first terminal of the EL lamp and a second NMOS transistor is coupled to the second terminal of the EL lamp.

12. An EL driver circuit in accordance with claim 10 whrein the regulation circuit comprises:
a comparator having an output coupled to the voltage regulation pin;
a voltage sensing device coupled to a first input of the comparator and coupled to the first capacitor and to the pulse width modulated switch oscillator for turning off the switching transistor when the voltage across the first capacitor exceeds a predetermined value; and
a reference voltage source coupled to a second input of the comparator.

13. An EL driver circuit in accordance with claim 12 wherein reference voltage source comprises:
a resistor coupled to the voltage regulation pin; and
a capacitor coupled to the resistor, wherein the capacitor and resistor form an RC circuit that dictates a rising edge of the EL lamp.

* * * * *